(12) United States Patent
Steinert et al.

(10) Patent No.: US 6,273,136 B1
(45) Date of Patent: Aug. 14, 2001

(54) DIFFERENTIAL VALVE, SPECIFICALLY A CABIN AIR DISCHARGE VALVE IN AN AIRCRAFT, AND METHOD FOR REGULATING CABIN PRESSURE

(75) Inventors: Martin Steinert, Seligenstadt (DE); Daniel Rumplik, Hampden, MA (US)

(73) Assignee: Nord-Micro Elektronik Feinmechanik, Frankfurt am Main (DE)

( * ) Notice: Subject to any disclaimer, the term of this patent is extended or adjusted under 35 U.S.C. 154(b) by 0 days.

(21) Appl. No.: 09/381,189

(22) PCT Filed: Mar. 25, 1998

(86) PCT No.: PCT/EP98/01758

§ 371 Date: Dec. 6, 1999

§ 102(e) Date: Dec. 6, 1999

(87) PCT Pub. No.: WO98/44300

PCT Pub. Date: Oct. 8, 1998

(51) Int. Cl.[7] ................. F24F 13/14; F16K 1/22
(52) U.S. Cl. .............. 137/630; 137/601.08; 137/601.15; 244/118.5; 251/279
(58) Field of Search ............ 137/601.08, 601.15, 137/601.17, 630, 630.15; 244/129.1, 118.5; 251/228, 232, 279, 280

(56) References Cited

U.S. PATENT DOCUMENTS

| Re. 31,471 | 12/1983 | Hagar . | |
|---|---|---|---|
| 2,299,865 | 10/1942 | Whitted . | |
| 2,349,727 | 5/1944 | Hopkins . | |
| 4,262,495 | * 4/1981 | Gupta et al. | 62/402 |
| 4,546,606 | * 10/1985 | Bouiller et al. | 137/601.05 |
| 4,742,760 | * 5/1988 | Horstman et al. | 454/76 |
| 5,881,995 | * 3/1999 | Tse et al. | 251/330 |

FOREIGN PATENT DOCUMENTS

| 673453 | 3/1939 | (DE) . |
| 1 890 465 | 4/1964 | (DE) . |
| 43 16 886 A1 | 5/1993 | (DE) . |
| 195 09 773 C1 | 3/1995 | (DE) . |
| 0 320 490 | 5/1986 | (EP) . |
| 0 364 108 A1 | 9/1989 | (EP) . |

* cited by examiner

Primary Examiner—Michael Powell Buiz
Assistant Examiner—Ramesh Krishnamurthy
(74) Attorney, Agent, or Firm—Stephen B. Salai, Esq.; Brian B. Shaw, Esq.; Harter, Secrest & Emery

(57) ABSTRACT

Disclosed is a differential valve specifically a cabin air discharge valve for use in the cabin pressure regulating system of an airplane. The valve has two valve stages for closing a valve port including a smaller first stage and a larger second stage. The first and second stages are connected to a common drive gear mechanism that actuates the smaller first valve stage separately and prior to actuating the larger second valve stage. Also disclosed is a method for regulating cabin pressure by means of the differential valve.

18 Claims, 3 Drawing Sheets

DIFFERENTIAL VALVE, SPECIFICALLY A CABIN AIR DISCHARGE VALVE IN AN AIRCRAFT, AND METHOD FOR REGULATING CABIN PRESSURE

The present invention relates to a multistage valve, more particularly a cabin air exhaust valve in an aircraft, the invention also relating to a method for cabin pressurization in an aircraft.

Multistage valves, more particularly cabin air exhaust valves in a cabin pressurization system of an aircraft, pressurize the cabin in a defined range vital to the safety of the persons on board and offering them maximum comfort. These multistage valves provide occupants with the partial pressure of the oxygen corresponding to the flight altitude. Actuating the multistage valves enables the cabin exhaust air mass flow to be regulated and It is known to make use of two separate valves for cabin pressurization, these valves being controlled so that one of the valves opens at a higher differential pressure, i.e. in high-altitude flight, whilst the second valve remains closed, it not being until low differential pressures exist, i.e. in low-altitude flight or on the ground, that the second valve also opens. Although this valve arrangement permits sufficiently good regulation of the cabin exhaust air mass flow the valving is complicated in configuration and is accordingly relatively cost-intensive in production. In addition to this the two valves need to be actuated via independent drive mechanisms.

A further known valve for cabin pressurization in an aircraft comprises a valve having a single flap which depending on the differential pressure existing between the cabin and the outer environment is opened correspondingly wide. Although such an arrangement simples design, other drawbacks are involved in such valving. It is usually the case that the exhaust air mass flow of the valve achieves an additionally effective boost in thrust. Such a boost in thrust can only be achieved with difficulty in a single-flap valve since the air mass flow cannot exhaust sufficiently channellized and oriented.

On the basis of cited prior art the present invention is based on the object of sophisticating a multistage valve, more particularly a cabin air exhaust valve in an aircraft such that the drawbacks as cited in prior art are obviated.

More particularly it is intended to provide a multistage valve which is simple and cost-effective in manufacture and with which an effective boost in thrust is possible by the exhaust air mass flow.

In accordance with a further aspect of the present invention a method is provided, permitting simple and effective means of cabin pressurization in an aircraft.

The object is achieved in accordance with the invention by a multistage valve, more particularly cabin air exhaust valve in an aircraft, comprising a smaller first valve stage and a larger second valve stage and a drive mechanism, the first valve stage and the second valve stage being connected to the drive mechanism such that the first valve stage is actuated separately from the second valve stage.

The multistage valve in accordance with the invention comprises two valve stages actuated via a single drive mechanism. Configuring and regulating the multistage valve in accordance with the invention results in an enormous increase in the economy of air-conditioning the cabin of the aircraft. This is particularly of importance since the air supply on board an aircraft, more particularly an airplane, is the largest secondary energy consumer. Furthermore, by separately actuating the smaller first valve stage and the larger second valve stage the air mass flow is able to exhaust from the multistage valve such that a high effective boost in thrust is achieved during flight. For this purpose, in high-altitude flight, i.e. when a high differential pressure predominates between the cabin interior and the outer environment, only the smaller first valve stage is opened from which the air mass flow is able to exhaust oriented and channellized. In low-altitude flight, i.e. when a low differential pressure predominates between the cabin interior and the outer environment, the second larger valve stage is opened so that a sufficiently large aperture is available for exhaust of the air mass flow.

Advantageously the first valve stage and/or the second valve stage are configured plate-shaped.

In one advantageous aspect of the invention the first valve stage and the second valve stage are arranged in a valve port. In this way only a single valve port is needed in the fuselage of the aircraft which furthermore reduces the expense of production and assembly.

In accordance with one preferred embodiment of the invention the first valve stage is arranged within the second valve stage.

In such an aspect of the multistage valve both valve stages may be pivoted to advantage about a single spindle which reduces the design expense of the multistage valve. Furthermore, it is possible in such an arrangement of the two valve stages that they are oriented within a single plane in both the fully open and fully closed setting of the multistage valve to thus ensure an oriented exhaust air mass flow with which in addition an effective boost in thrust is achieved for low actuating forces.

Advantageously the first valve stage may be configured rectangular and/or the second valve stage may comprise a round base geometry. The round base geometry of the second valve stage permits simple and cost-effective production and in addition makes it possible to simply adapt the multistage valve in the valve port of the aircraft fuselage whilst achieving an advantageous sealing effect.

The contour of the smaller first valve stage as well as the inner shape of the larger second valve stage are configured aerodynamically condusive, more particularly a maximum boost in thrust being achieved for a minimum torque requirement.

In accordance with another embodiment of the present invention the first valve stage and the second valve stage are arranged in sequence.

Here again, both valve stages are arranged within a single valve port in the fuselage of the aircraft thus ensuring cost-effective production and assembly of the multistage valve. Furthermore, it is achieved by the arrangement of the valve stages in accordance with the invention that the two valve stages are oriented in a single plane in the fully closed condition of the multistage valve, whilst the two valve stages are oriented parallel to each other in the fully open setting of the multistage valve. By a corresponding arrangement of the valve stages a maximum boost in thrust is achievable. It is furthermore possible to select the fulcrums of the valve stages individually, thus requiring only minimum actuating forces to open and close the multistage valve.

Advantageously the first valve stage and/or the second valve stage is configured rectangular.

In yet another advantageous aspect of the invention the drive mechanism is configured as a linkage mechanism comprising at least two links each rotatably connected to the other.

Linkage mechanisms are characterized by their links moving in parallel planes due to their rotative connection.

The advantages of linkage mechanisms as compared to other mechanisms are due to the links being simple and thus cost-effective to produce, the relative points of contact in the pivots as well as the resulting high loading capacity of the linkage mechanism. In addition, a broad pallet of many and varied applications exists for linkage mechanisms, especially due to their wealth of various structures, shapes and movement possibilites. This is the reason why linkage mechanisms can be adapted to practically any requirements as to application and space availability by suitably selecting the number of links and their geometric configuration.

Advantageously the at least two links are connected to each other via pivots.

In one advantageous aspect the drive mechanism comprises four links.

Configuring the drive mechanism with four links achieves more particularly a uniform rotary movement of the drive unit being converted into a non-uniform rotary movement of individual valve stages, resulting in differing opening angles of the individual valve stages. Despite the non-uniform rotary movements of the individual valve stages it is nevertheless achieved that the two valve stages in both the fully open and fully closed setting are oriented in the same position.

In accordance with the invention the first valve stage and the second valve stage may be arranged such that they are oriented in the same position when fully open and fully closed to thus achieve that the exhaust air mass flow is opposed by only a minor resistance of the valve stages in the open setting. In this arrangement the two valve stages— depending on the embodiment of the multistage valve—may form in these settings for example a single plane or line or, however, may be oriented parallel to each other. It is especially in the closed setting, however, that the two valve stages need to be oriented in a single plane to achieve an adequate sealing effect of the multistage valve.

In another advantageous aspect the drive mechanism comprises three links, as a result of which, designing the drive mechanism is simplified.

In accordance with yet another improvement the multistage valve is provided with a frame surrounding the valve port. This frame channelizes the exhaust air flow from the multistage valve and improves the exhaust air flow.

Preferably the frame is provided in a curved portion serving as the contact surface area for the first valve stage. On opening and closing the first valve stage the latter slides by a correspondingly shaped section along the curved portion of the frame to thus achieve reliable guidance of the first valve stage.

Preferably the first valve stage and the second valve stage are arranged such that on opening of the first valve stage an aperture materializes facing away from the second valve stage. An exhaust air mass flow from this aperture does not press against the second valve flap, thus enabling it to be actuated with less force. This reduces the torque needed to actuate the multistage valve so that less driving energy needs to be made available. At the same time smaller and lighter drive elements may be employed.

Preferably the first valve stage in the fully open condition is remote from the valve port, as a result of which the maximum size of the valve port is enlarged so that exhaust of an air mass flow is facilitated. At the same time the first valve stage ensures in its fully open setting that the exhaust air mass flow is channellized.

With the multistage valve in accordance with the invention as described above valving is provided with which the first valve stage and the second valve stage are actuated by a single drive mechanism and wherein a smaller first valve stage finds application as the pressurization stage during flight at a high differential pressure and the larger second valve stage additionally opens at a lower differential pressure.

In accordance with a further aspect of the present invention a method is provided for cabin pressurization in an aircraft, more particularly in an airplane, via a multistage valve as described above, this method comprising the steps:

a) actuating the smaller first valve stage as the pressurization stage via the drive mechanism during flight at a high differential pressure; and b) additionally actuating the larger second valve stage via the drive mechanism during flight at a low differential pressure the first valve stage being actuated separately from the second valve stage By the method in accordance with the invention it is achieved that due to the exhaust air mass flow during flight a maximized effective boost in thrust is attained. As regards the advantageous effects and the way in which these are achieved in the method in accordance with the invention reference is made to the comments as given above regarding the multistage valve in accordance with the invention.

In another advantageous aspect of the method the first valve stage and the second valve stage are driven by the drive mechanism such that they are oriented in the same position when fully open and fully closed.

In accordance with yet another aspect of the present invention the multistage valve in accordance with the invention as described above is employed as a cabin air exhaust valve in a cabin pressurization system of an aircraft, more particularly of an airplane.

The invention will now be detailed by way of example embodiments with reference to the drawing in which FIG. 1 is a cross-section through a multistage valve in accordance with a first embodiment of the invention, the valve stages being illustrated in the closed setting;

Figure 1:
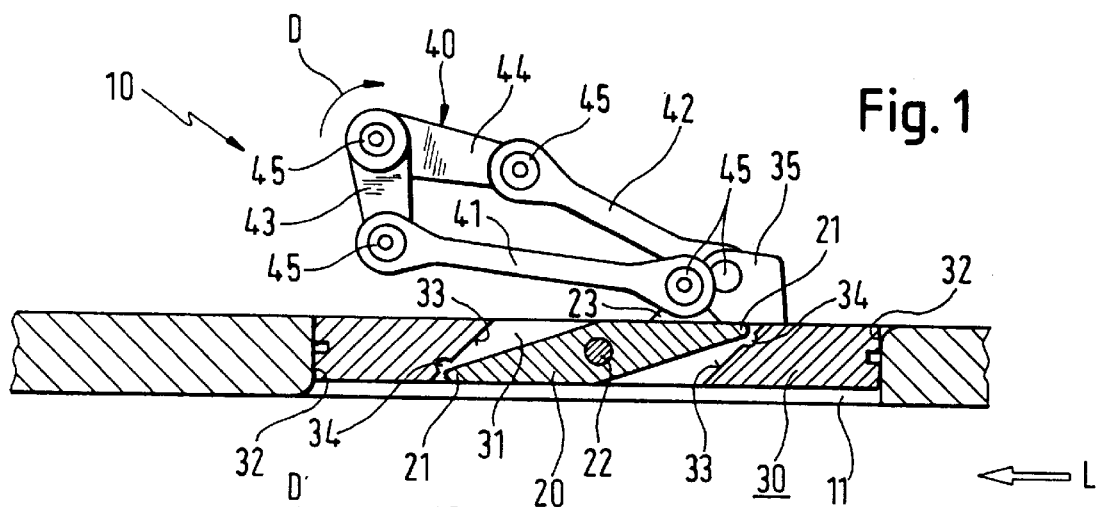
Figure 2:
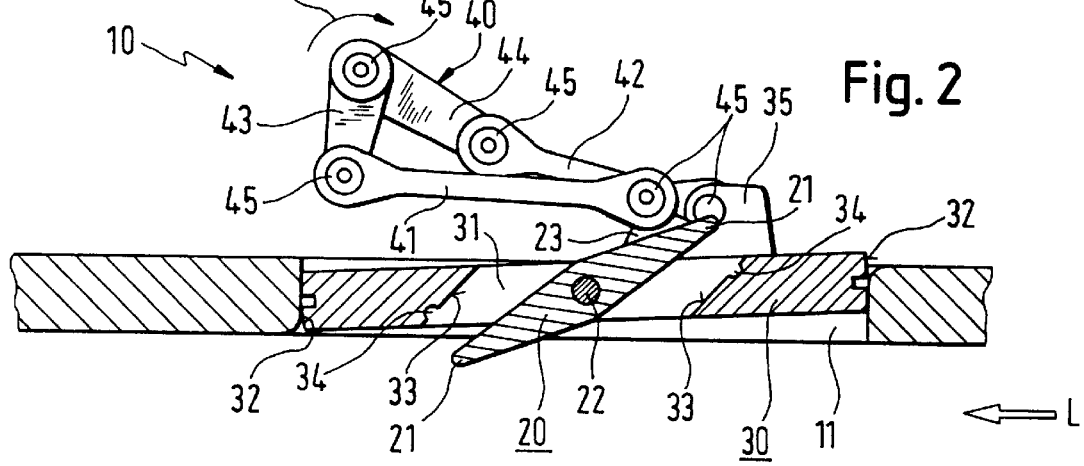
FIG. 2 is a cross-section through the multistage valve as shown in FIG. 1, the smaller first valve stage of which is illustrated open.
Figure 3:
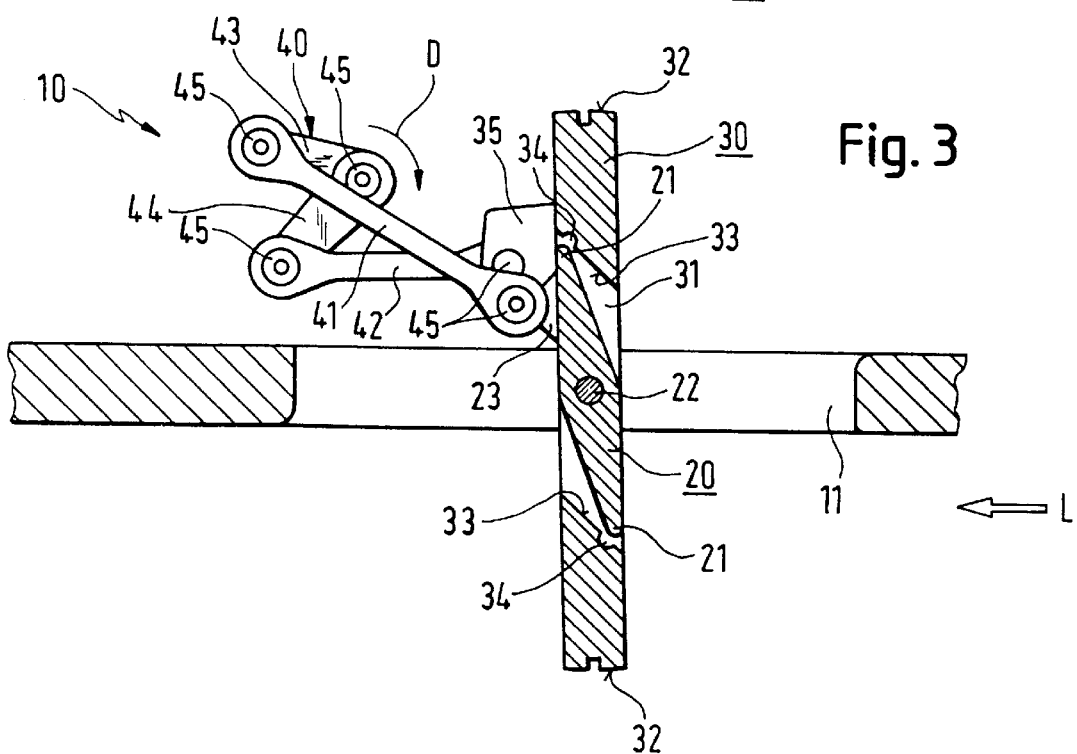
FIG. 3 is a cross-section through the multistage valve as shown in FIG. 1, both valve stages of which are illustrated fully open.

Illustrated in the FIGS. 1 to 3 is a first example embodiment of the invention.

Referring now to FIG. 1 there is illustrated a multistage valve 10 in a valve port 11 of an aircraft. The multistage valve 10 comprises a smaller first valve stage 20 and the second valve stage 30 are arranged rotatable in the multistage valve 10 via a common spindle 22. The second valve stage 30 comprises a round base geometry, whilst the first valve stage 20 is configured rectangular. In any case the first valve stage 20 and the second valve stage 30 are configured such that they feature an aerodynamically condusive configuration.

The second valve stage 20 comprises ends 32 oriented in the direction of the valve port 11. The ends 32 are provided slightly rounded so that the second valve stage 30 has facilitated rotatation in the valve port 11. Furthermore the valve port 11 is provided with slightly recessed edges to additionally improve the rotatability of the second valve stage 30.

The second valve stage 30 comprises an aperture 31 in which the first valve stage 20 is rotatably arranged. The walls 33 of the valve stage 30 in the region of the aperture 31 are configured slanting and each comprises a cutout 34 accommodating the ends 21 of the first valve stage 20 in the closed setting of the multistage valve 10. Sealing elements may be provided in the cutouts 34.

The first valve stage 20 has approximately the shape of a parallelogram, the first valve stage 20 comprising in the region of its spindle 22 its maximum diameter and converging at an acute angle to the ends 21. By this configuration of the first valve stage 20 it is achieved that the ends 21 in the closed setting of the multistage valve come into contact with the walls 33 and cutouts 34, in which sealing elements may be provided, of the second valve stage 30 so that no air mass flow can exhaust from the multistage valve 10.

The smaller first valve stage 20 and the larger second valve stage 30 are driven via a single drive mechanism 40. The drive mechanism 40 comprises a total of four links 41, 42, 43, 44 each connected to the other rotatably via pivots 45. The first valve stage 20 is connected to the bone-shaped link 41 via a fastener portion 23. The first valve stage 30 is connected to the bone-shaped link 42 via a fastener portion 35. The links 41, 41 are indirectly connected to each other via links 43, 44. The drive unit (not shown) of the drive mechanism 40 is connected to the drive mechanism in the connecting portion of the links 43 and 44.

The incident flow of the multistage valve 10 is in the direction of the arrow L.

The functioning of the multistage valve 10 will now be detained with reference to the FIGS. 1 to 3. In FIG. 1 the multistage valve 10 is illustrated in the closed setting. Both the first valve stage 20 and the second valve stage 30 are accordingly in the closed setting. Due to the fact that the ends 21 of the first valve stage 20 are in contact with the walls 33 and the cutouts 34, in which sealing elements may be provided, of the second valve stage 30, the air mass flow is unable to exhaust from the multistage valve 10.

Referring now to FIG. 2 there is illustrated the multistage valve 10 with the open first valve stage 20. One such setting of the multistage valve 10 occurs, for example, when the aircraft is cruising, i.e. flying at high altitudes. When the aircraft is cruising a high differential pressure predominates between cabin interior and the outer environment of the aircraft. To generate an effective air mass flow resulting in an effective boost in thrust it is sufficient that only the first valve stage 20 is open whilst the second valve stage 30 remains closed when a high differential pressure exists. To achieve such a positioning of the two valve stages 20, 30 of the multistage valve 10 the drive mechanism 40 is turned in the direction of rotation as indicated by the arrow D. Since the first valve stage 20 is connected to the link 41 of the drive mechanism 40 rotatably but nevertheless fixedly via the fastener portion 23, a movement of the drive mechanism as indicated by the arrow D results in opening of the first valve stage 20. Due to employing a drive mechanism 40 having a total of four links the uniform rotary movement of the drive mechanism (not shown) for the drive mechanism 40 is converted into a non-uniform rotary movement of the individual valve stages 20, 30. This results in differing opening angles of the valve stages. In the present example embodiment, due to. the correspondingly selected links, more particularly as regards their length, angular setting and positioning it is achieved that the first valve stage 20 can be opened by actuating the drive mechanism 40, whilst the second valve stage 30 remains closed. In the illustration as shown in FIG. 2 the first valve stage 20 has opened sufficiently so that not only an advantageous control of the exhaust air mass flow is assured but also that at the same time an effective boost in thrust is achieved for low actuating forces, The second valve stage 30 continues to remain closed so that no air mass flow can exhaust.

When a low differential pressure predominates between the cabin interior and the outer environment of the aircraft, for example in low-altitude flight or on the ground, it is necessary that the air mass flow is able to exhaust through a sufficiently large opening. This is why at low differential pressures the multistage valve 10 needs to be fully open, as is illustrated in FIG. 3. Due to the drive mechanism 40 being turned further in the direction of the arrow D the links 42, 44 now in contact with the second valve stage 30 are shifted, as a result of which the second valve stage 30 is also opened. In the fully open setting of the multistage valve 10 as shown in FIG. 3 the two valve stages 20, 30 are oriented in a single plane or line so that the air mass flow encounters minimum resistance by the existing low differential pressure. A maximum opening for exhausting the air mass flow continues to be generated by the setting of the multistage valve 10.

Figure 4:
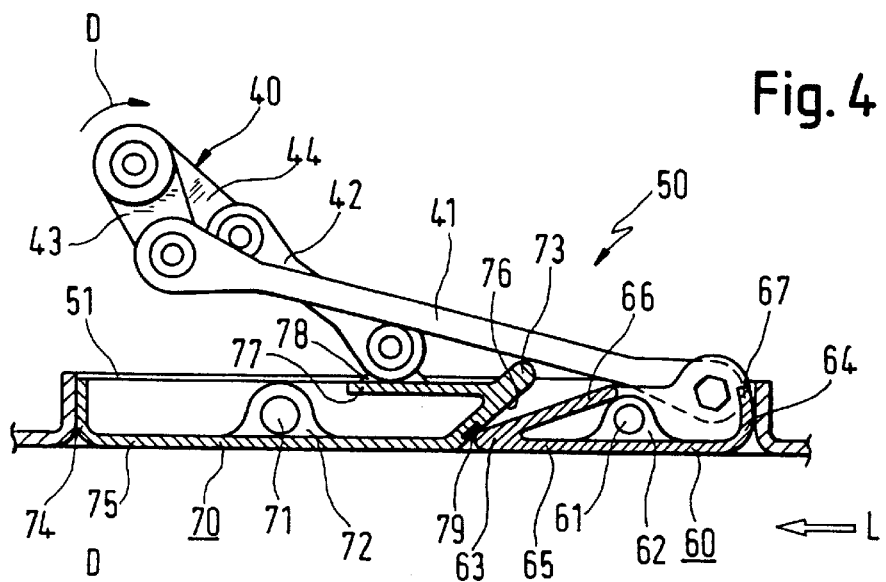
FIG. 4 is a cross-section through a multistage valve in accordance with a second embodiment of the invention, both valve stages of which are illustrated fully closed.
Figure 5:
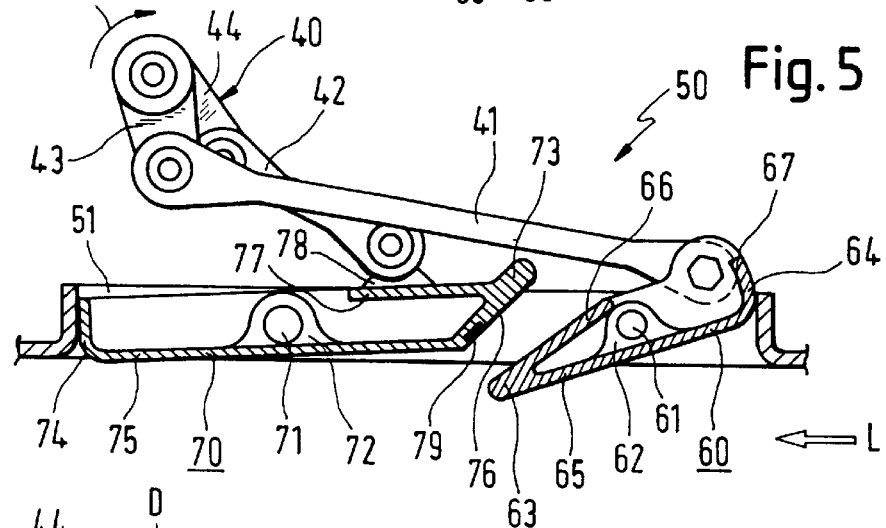
FIG. 5 is a cross-section through the multistage valve as shown in FIG. 4, the smaller first valve stage of which is illustrated open.
Figure 6:
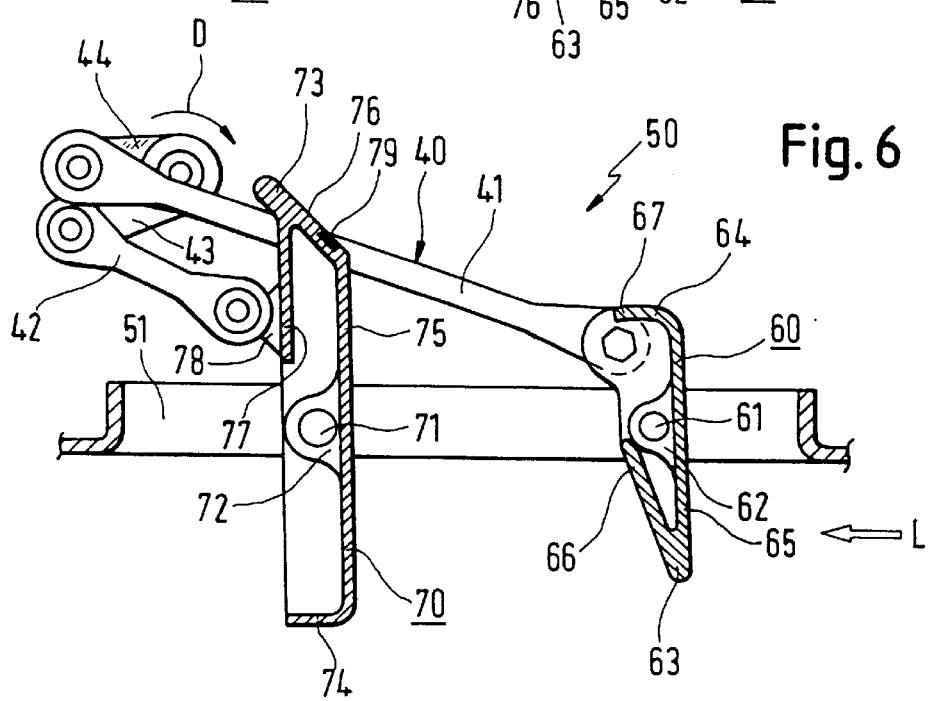
FIG. 6 is a cross-section through the multistage valve as shown in FIG. 4, both valve stages of which are illustrated fully open.

In FIGS. 4 to 6 a further example embodiment of the multistage valve in accordance with the invention is illustrated.

Referring now to FIG. 4. there is illustrated the multistage valve 50, again arranged in a valve port 51 of an aircraft fuselage. The multistage valve 50 comprises a first valve stage 60, a second valve stage 70 as well as a drive mechanism 40. The drive mechanism 40 corresponds in its configuration to that of the drive mechanism as illustrated in FIGS. 1 to 3 so that like components, or like in function, are identified by like reference numerals, without a repeat detailed description of the drive mechanism 40. The first valve stage 60 and the second valve stage 70 each having a rectangular base geometry are arranged in sequence in the valve port 51.

The smaller first valve stage 60 is configured plateshaped and rotatably arranged in the multistage valve 50 via a spindle 61 and a fastener portion 62. The first valve stage 60 comprises a baseplate 65, a guide plate 66 as well as an end portion 64 oriented in the direction of the wall of the valve port 51, Provided in the free end of the end portion 64 is a fastener section 67 via which the first valve stage 60 is rotatably connected to the link 41 of the drive mechanism 40. The guide plate 66 guiding the air mass flow and the baseplate 65 are arranged inclined to each other and merge in an end portion 63 configured in the direction of the second valve stage 70.

The second valve stage 70 is rotatably arranged in the multistage valve 50 via a spindle 71 as well as, via a fastener portion 72. The second valve stage 70 too, is configured plate-shaped and comprises an end portion 74 oriented in the direction of the wall of the valve port 51, a baseplate 75 and a guide plate 76 guiding the air mass flow, as well as a fastener plate 77. Provided at the fastener plate 77 is a fastener section 78 via which the second valve stage 70 is connected rotatably with the link 42 of the drive mechanism 40. The guide plate 76 which in the closed condition of the multistage valve 50 comes into contact with the end portion 63 of the first valve stage 60 comprises in the portion in which the end portion 63 of the first valve stage 60 is in contact with the guide plate 76 of the second valve stage 70 an additional sealing element 79. As shown in FIG. 4 the end portion 63 of the first valve stage 60 is forced against the sealing element 79 of the second valve stage 70 in the closed condition as a result of which any exhaust of the air mass flow in the closed condition of the multistage valve 50 is reliably and totally avoided. Furthermore, the guide plate 76 comprises a beaded widened end 73. The end 73 has the task of diverting the air mass flow in the open condition of the multistage valve 50 to the guide plate 76. The beaded configuration of the end 73 is not, however, mandatory, i.e. other configurations of the guide plate being just as conceivable, as long as the valve stages are configured aerodynamically condusive.

The end portions 64 and 74 of the first valve stage 60 and second valve stage 70 opposite the wall of the valve port 51 are configured slightly rounded to facilitate rotation of the first valve stage 60 and second valve stage 70 within the valve port 51. Furthermore, the fulcrums of the first valve stage 60 and the second valve stage 70 defined by the spindles 61, 71 and the fastener portions 62, 72 may be selected as a function of the size of the valve stages and the requirements of the application such that only minimum actuating forces are needed to open and close the multistage valve 50.

The incident flow of the multistage valve 50 is in the direction of the arrow L.

The functioning of the multistage valve 50 will now be detailled with reference to the FIGS. 4 to 6.

In FIG. 4 the multistage valve 50 is illustrated in the closed position. Both valve stages 60 and 70 are in their fully closed setting. In this arrangement the two valve stages 60 and 70 are oriented in a single plane and thus in the same position. To prevent exhaust of the air mass flow existing in the interior of the cabin of the aircraft from the step valve 50 the inclined end portion 63 of the first valve stage 60 is firmly urged in contact with the likewise inclined guide plate 76 of the second valve stage 70. In addition to this, the additional sealing element 79 is provided in this portion to ensure total sealing of the multistage valve.

Referring now to FIG. 5 there is illustrated the multistage valve 50 with the first valve stage 60 open. This valve setting is selected when the aircraft is cruising., i.e. when a high pressure differential predominates between the cabin interior and the outer environment of the aircraft. The first valve stage 60 is open so far that not only control of the exhaust air mass flow is assured but also at the same time a maximum boost in thrust is achieved by the exhaust air mass flow. The second valve stage 60 continues to be closed so that no air mass flow can exhaust. The air mass flow is deflected by the end 73 of the second valve stage 70 and channellized by the inclined guide plates 66 and 76. Opening the first valve stage 60 is done by rotatation of the drive mechanism 40 in the direction of the arrow D.

Referring now to FIG. 6 there is illustrated the multistage valve 50 in its fully open setting. This open position of the multistage valve 50 is selected when only a low differential pressure predominates between the cabin interior and the outer environment of the aircraft as is the case, for example, in low-altitude flight or on the ground.

Although both the first valve stage 60 and the second valve stage 70 in the fully open setting are again oriented in the same position, unlike the situation in the example embodiment as shown in FIGS. 1 to 3, however, in the present example embodiment they are not oriented in the same plane, but parallel to each other. This orientation of the two valve stages 60, 70 also achieves that the air mass flow is confronted only by a minimum resistance. At the same time as large an opening as possible is provided from which the air mass flow is able to exhaust from the multistage valve 50.

Figure 7:
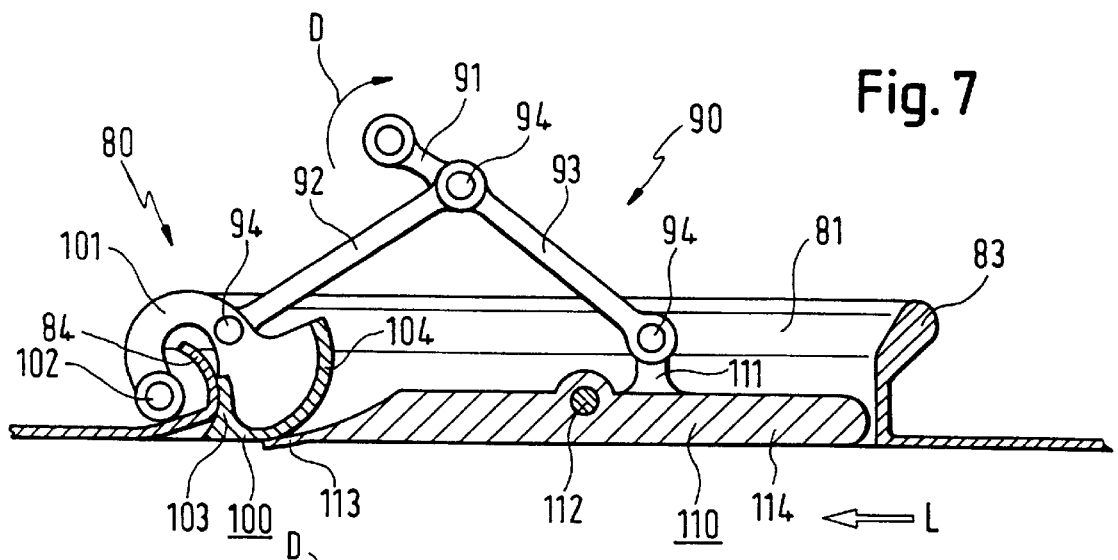
FIG. 7 is a cross-section through a multistage valve in accordance with a third embodiment of the invention, both valve stages of which are illustrated closed.
Figure 8:
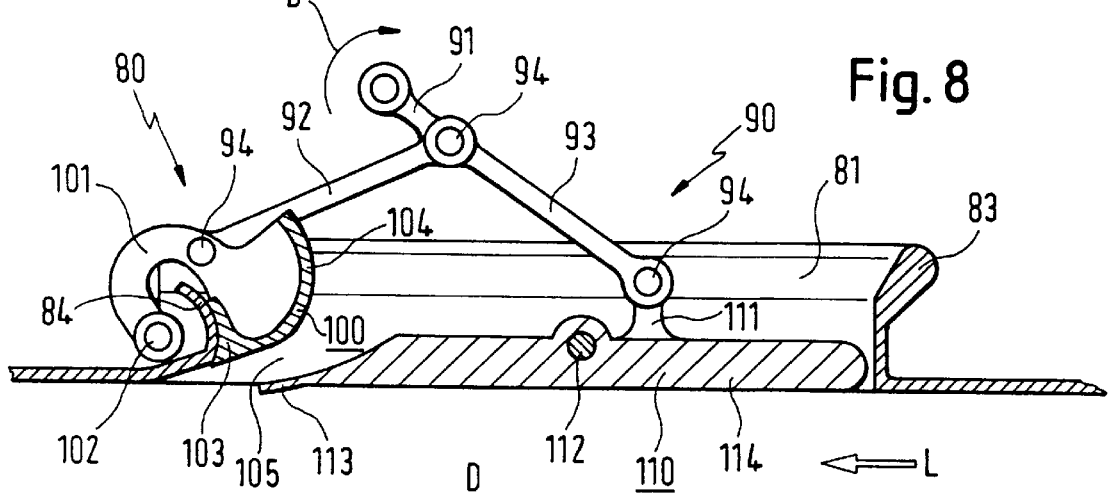
FIG. 8 is a cross-section through the multistage valve as shown in FIG. 7, the smaller first valve stage of which is illustrated open.
Figure 9:
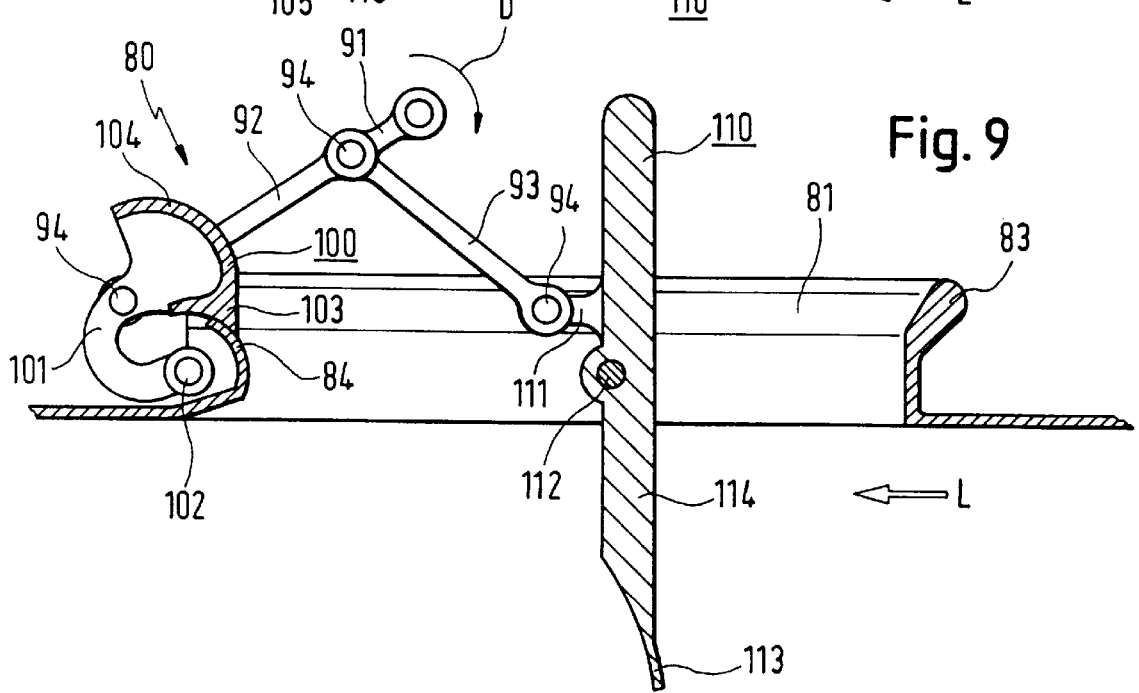
FIG. 9 is a cross-section through the multistage valve as shown in FIG. 7, both valve stages of which are illustrated fully open.

In the FIGS. 7 to 9 yet a further example embodiment of the multistage valve in accordance with the invention is illustrated.

Referring now to FIG. 7 there is illustrated the multistage valve 80 again arranged in a valve port 81 of an aircraft fuselage. The multistage valve 80 comprises a first valve stage 100, a second valve stage 110 as well as a drive mechanism 90. The first valve stage 100 and the second valve stage 110 are arranged in sequence in the valve port 81. Unlike the situation of the embodiments as shown in FIGS. 1 to 6 it is here the second valve stage 110 and then the first valve stage 100 that receives the air flow in the direction of the arrow L.

The multistage valve 80 is configured roughly rectangular and provided with a frame 83. This frame surrounds the valve port 81 on three sides. At the fourth side at which the first valve stage 100 is arranged the frame is provided with a curved portion 84.

The drive mechanism 90 comprises three links 91, 92, 93 connected to each other via pivots 94. The links 92 and 93 serving to actuate the valve stages 100, 110 are connected to the link 91 on a common spindle. Pivoting the valve stages 100, 110 is likewise achieved via pivots 94.

The first valve stage 100 comprises a bracket 101 pivotable about a spindle 102. The bracket 101 is rigidly connected to two sections 103, 104 forming roughly a quarter of a cylinder. In this arrangement the section 103 is adapted to the curvature at the portion 84 of the frame and is thus able to slide thereon. The section 104 comprises roughly the shape of a quarter-circle.

The second valve stage 110 comprises a fastener section 111 supporting the pivot 94 for attaching the link 93 and which is pivotable about the spindle 112. To facilitate pivoting, the second valve stage 110 is rounded at the side facing the frame 83. The second valve stage 110 comprises furthermore at the side facing the first valve stage 100 a, for instance, lip-type section 113, it becoming thicker from this section 113 to a further roughly plate-shaped section 114.

The functioning of the multistage valve 80 will now be detained with reference to the FIGS. 7 to 9.

Referring now to FIG. 7 there is illustrated the multistage valve 80 in the closed position. Both valve stages 100, 110 are in their fully closed setting. In this arrangement the two valve stages 100, 110 are oriented substantially in a single plane and thus in the same position. To prevent exhaust of the air mass flow existing in the interior of the cabin of the aircraft from the multistage valve 80 the roughly quarter-circle shaped section 104 of the first valve stage 100 is firmly urged against the lip-type section 113 of the second valve stage 110. In addition sealing elements (not shown) may also be provided.

To open the multistage valve 80 the link 91 is pivoted in the direction of the arrow D. This results in the first valve stage 100 being slightly opened as shown by the situation in FIG. 8. This valve setting is selected when the aircraft is cruising, i.e. when a high differential pressure predominates between the cabin interior and the outer environment of the aircraft. The first valve stage 100 is open so far that not only control of the exhaust air mass flow is assured but also at the same time a maximum boost in thrust is achieved by the exhaust air mass flow. In this arrangement the exhaust air mass flow flows through an aperture 105 formed between the section 104 of the first valve stage 100 and the second valve stage 110. The second valve stage 110 continues to be closed sufficiently so that no air mass flow can exhaust. Channellizing the exhaust air mass flow is done by the section 113 of the second valve stage 110, the section 104 of the first valve stage 100 as well as by the frame 83.

Referring now to FIG. 9 there is illustrated the multistage valve 80 in its fully open setting achieved by pivoting the link 91 further in the direction of the arrow D. This open setting of the multistage valve 80 is selected when only a low differential pressure predominates between the cabin interior and the outer environment of the aircraft as is the case, for example, in low-altitude flight or on the ground.

In the fully open condition the first valve stage 100 is remote from the valve port 81. In this arrangement the section 104 is configured so that it completes the frame 83 in this fully open condition to thus achieve good channellization of the exhaust air mass flow. In the fully open condition the second valve stage 110 is arranged substantially parallel to the valve port 81, it thus presenting a very small resistance to the exhaust air mass flow whilst maximizing the valve port 81 at the same time.

In the embodiment of the multistage valve 80 as shown in FIGS. 7 to 9 air incident flow in the direction of the arrow L is such that first the second valve stage 110 receives the incident flow and then the first valve stage 100. This arrangement of the valve stages 100, 110 reduces the torque needed to actuate the multistage valve 80 as will now be explained with reference to FIG. 8.

Referring now to FIG. 8 there is illustrated the multistage valve 80 with the first valve stage 100 open. The opening 105 permits an air mass flow exit. This air mass flow mixes with the ambient air flowing by in the direction of the arrow L, thus resulting in a swirl which due to the differences in pressure materializing in the swirling actions produces forces occurring downstream of the multistage valve in the direction of the arrow L and thus do not act on the second valve stage 110 but directly on the fuselage of the aircraft. The second valve stage 110 is thus influenced substantially only by the differential pressure between the cabin and the ambient air but not by the swirling actions. It is thus able to be brought into its fully open setting as shown in FIG. 9 with less torque than in the embodiment as shown in FIGS. 4 to 6.

Common to all embodiments of the invention is that the multistage valve may be arranged in a single valve port of the aircraft and that the smaller first valve stage may be actuated separate from the larger second valve section via a single drive mechanism thus achieving maximum boost in thrust by the exhaust air mass flow in saving energy. For an adequate seal, sealing elements may be provided between the ends of the valve stages and each valve aperture as well as between the intercommunicating portions of the valve stages themselves. To simplify the illustration these sealing elements are shown only in part in the Figs.

What is claimed is:

1. A multistage valve, more particularly a cabin air exhaust valve in an aircraft comprising a smaller first valve stage (20; 60; 100) and a larger second valve stage (30; 70; 110) arranged in a valve port (11; 15; 31) and a drive mechanism (40; 90), said first valve stage (20; 60; 100) and said second valve stage (30; 70; 110) being operatively connected to said drive mechanism (40; 90) and said drive mechanism (40; 90) being constructed and arranged to actuate and always open said first valve stage (20; 60; 100) prior to and separately from the subsequent actuation and opening of said second valve stage (30; 70; 110).

2. The multistage valve as set forth in claim 1, characterized in that said first valve stage (20; 60; 100) and/or said second valve stage (30; 70; 110) are configured plate-shaped.

3. The multistage valve as set forth in claim 1, characterized in that said first valve stage (20; 60; 100) and said second valve stage (30; 70; 110) are arranged in a valve port (11; 51; 81).

4. The multistage valve as set forth in claim 1, characterized in that said first valve stage (20) is arranged within said second valve stage (30).

5. The multistage valve as set forth in claim 4, characterized in that said first valve stage (20) is configured rectangular and/or said second valve stage (30) comprises a round base geometry.

6. The multistage valve as set forth in claim 1, characterized in that said first valve stage (60; 100) and said second valve stage (70; 110) are arranged side-by-side in said valve port (51; 81).

7. The multistage valve as set forth in claim 6, characterized in that said first valve stage (20; 60) and/or said second valve stage (70; 110) is configured rectangular.

8. The multistage valve as set forth in claim 1, characterized in that said drive mechanism (40; 90) is configured as a linkage mechanism comprising at least two links (41, 42, 43, 44; 91, 92, 93) each rotatably connected to the other.

9. The multistage valve as set forth in claim 8, characterized in that said at least two links (41, 42, 43, 44; 91, 92, 93) are connected to each other via pivots (45; 94).

10. The multistage valve as set forth in claim 1, characterized in that said first valve stage (20; 60) and said second valve stage (30; 70) are arranged such that they are oriented in the same position when fully open and fully closed.

11. The multistage valve as set forth in claim 8, characterized in that said drive mechanism (40) comprises four links (41, 42, 43, 44).

12. The multistage valve as set forth in claim 8, characterized in that said drive mechanism (90) comprises three links (91, 92, 93).

13. The multistage valve as set forth in claim 12, characterized in that said multistage valve (80) is provided with a frame surrounding said valve port (81).

14. The multistage valve as set forth in claim 13, characterized in that said frame (83) comprises a curved portion (84) as the contact surface area for said first valve stage (100).

15. The multistage valve as set forth in claim 14, characterized in that on opening of said first valve stage (100) an aperture (105) materializes facing away from said second valve stage (110).

16. The multistage valve as set forth in claim 12, characterized in that said first valve stage (100) in said fully open condition is remote from said valve port (81).

17. A method for cabin pressurization in an aircraft, more particularly in an airplane comprising the following steps:
   a) providing a multistage valve (10; 50; 80) having a smaller first valve stage (20; 60; 100) and a larger second valve stage (30; 70; 110) arranged in a common valve port (11; 51; 81) and connected to a common drive mechanism (40; 90) for opening said valve stages separately with the first smaller stage opening prior to the second larger stage;

b) operating the drive mechanism (40; 90) for actuating and opening the smaller first valve stage for partially opening the valve port (11; 51; 81) to pressurize the cabin during flight at a high differential pressure; and c) operating the drive mechanism (40; 90) for actuating and opening the larger second valve stage (30; 70; 110) after opening the smaller first valve stage and in addition to the opening of the smaller first valve stage for fully opening the valve port during flight at a low differential pressure.

18. The method as set forth in claim 17, characterized in that said first valve stage (20; 60) and said second valve stage (30; 70) are oriented in the same position by said drive mechanism (40) when set fully open and fully closed.

* * * * *